United States Patent [19]
Yamahira et al.

[11] Patent Number: 5,601,950
[45] Date of Patent: Feb. 11, 1997

[54] NON-AQUEOUS ELECTROLYTE SECONDARY CELL

[75] Inventors: Takayuki Yamahira; Yoshiaki Takeuchi, both of Fukushima, Japan

[73] Assignee: Sony Corporation, Tokyo, Japan

[21] Appl. No.: 493,464

[22] Filed: Jun. 22, 1995

[30] Foreign Application Priority Data

Jun. 29, 1994 [JP] Japan .................. 6-148311

[51] Int. Cl.$^6$ .................. H01M 4/36; H01M 4/58; H01M 4/62
[52] U.S. Cl. .................. 429/218; 424/194; 424/232
[58] Field of Search .................. 429/194, 218, 429/232

[56] References Cited

U.S. PATENT DOCUMENTS

| | | | |
|---|---|---|---|
| 5,053,297 | 10/1991 | Yamahira et al. | 429/194 |
| 5,077,153 | 12/1991 | Grange-Cossou et al. | 429/211 |
| 5,185,224 | 2/1993 | Barnabei et al. | 429/218 |
| 5,272,022 | 12/1993 | Takami et al. | 429/197 |
| 5,385,794 | 1/1995 | Yokoyama et al. | 429/194 |
| 5,427,875 | 6/1995 | Yamamoto et al. | 429/223 |

FOREIGN PATENT DOCUMENTS

| | | |
|---|---|---|
| 0309171 | 3/1989 | European Pat. Off. . |
| 0527054 | 2/1993 | European Pat. Off. . |
| 5121097 | 5/1993 | Japan .................. H01M 10/40 |
| 5251080 | 9/1993 | Japan .................. H01M 4/58 |

*Primary Examiner*—Stephen Kalafut
*Assistant Examiner*—Richard H. Lilley, Jr.
*Attorney, Agent, or Firm*—Hill, Steadman & Simpson

[57] ABSTRACT

A non-aqueous electrolyte secondary cell having a negative electrode, a positive electrode and a non-aqueous electrolytic solution, in which a carbonaceous material is used as an active negative-electrode material, is disclosed. The negative electrode is constituted by a carbon sintered mass obtained on sintering the carbonaceous material or a carbon sintered mass-current collector composite material. The secondary cell is improved in the amount of the active material packed in the negative electrode, energy density and in the charging/discharging efficiency. If the carbon sintered mass-current collector composite material is employed for the negative electrode, further improvement in the electrical conductivity and charging/discharging efficiency in the negative electrode is achieved.

8 Claims, 1 Drawing Sheet

NON-AQUEOUS ELECTROLYTE SECONDARY CELL

BACKGROUND OF THE INVENTION

This invention relates to a non-aqueous electrolyte secondary cell and, more particularly, to a non-aqueous electrolyte secondary cell employing a carbonaceous material for its negative electrode.

Recently, a proliferation of video camera and audio cassettes has caused an increased demand for reusable, rechargeable secondary cells to take the place of primary cells which are disposable.

Most of the secondary cells, now in use, are nickel-cadmium cells employing an alkaline electrolyte solution. These secondary cells have a voltage of approximately 1.2 V and it is difficult to raise their energy density. In addition, these secondary cells have a high self-discharge rate at ambient temperature of not less than 20% per month.

For this reason, non-aqueous electrolyte secondary cells employing a non-aqueous solution as an electrolyte and light metal such as lithium for a negative electrode are currently being investigated. These non-aqueous electrolyte secondary cells have a high voltage of 3 V and hence a high energy density. They also provide advantages such as low self-discharge rate and lightness of weight. However, if the non-aqueous electrolyte secondary cell employing lithium for its negative electrode is charged and discharged repeatedly, metal lithium tends to undergo dendritic crystal growth from the negative electrode until it contacts with the positive electrode. The dendritic crystal growth causes shorting in the inside of the cell which leads to difficulties in practical utilization of the cell.

To overcome this problem, non-aqueous electrolyte secondary cells in which lithium is alloyed with other metals and the resulting alloy is used for the negative electrode are also being investigated. However, these cells have a defect in that, if the cell is charged and discharged repeated, the alloy constituting the negative electrode tends to be comminuted in size, again leading to difficulties in practical utilization of the cell.

Also proposed are non-aqueous electrolyte secondary cells employing a carbonaceous material, such as coke, as an active negative electrode material. These non-aqueous electrolyte secondary cells provide for doping/undoping of lithium ions to and from the spacing between carbon layers. Accordingly, these cells are no susceptible to precipitation of metal lithium nor to alloy comminution as occurs with cells employing metal lithium or lithium alloy as the active negative electrode material. These cells exhibit optimum cyclic characteristics. If a lithium/transition metal composite oxide represented by $Li_xMo_2$ where M denotes one or more transition metals and x is such that $0.05 \leq x \leq 1.10$ is used as an active positive electrode material, as disclosed in JP Patent Kokai Publication JP-A-63-135099 (1988) or JP Patent Kokai Publication JP-A-1-304664 (1989), the cell capacity may be improved, so that it becomes possible to produce a non-aqueous electrolyte secondary cell having high energy density.

However, as compared to the non-aqueous electrolyte secondary cell employing metal lithium or lithium alloy as the active negative electrode material, the non-aqueous electrolyte secondary cells, employing a carbonaceous material as the active negative electrode material, are inferior in energy density, although they are superior in cyclic service life and safety.

One of the reasons for this is carbonaceous materials typically employed as the active negative electrode material comprise slurries of powders of the carbonaceous material kneaded with a binder or a dispersant. The slurries are coated on a current collector or are directly molded to form a negative electrode. The concentration of active material present in the slurries is decreased by an amount corresponding to the binder content. The binder which may comprise 10 to 20% of the negative electrode does not contribute to the cell capacity.

Efforts to improve the energy density of these cells have included attempts to increase the packing density of the carbonaceous materials. However, packing density cannot be raised beyond a certain limit value, which impedes any further increase in the energy density.

SUMMARY OF THE INVENTION

In view of the foregoing, it is a principal object of the present invention to provide a non-aqueous electrolyte secondary cell comprising a carbonaceous material as an active negative electrode material having a high energy density.

The present inventors have now discovered that an agglomerated carbon sintered mass, obtained by sintering a specific carbonaceous material may be used to provide an active anode material without employing a binder.

The present invention provides a non-aqueous electrolyte secondary cell comprising a negative electrode including a carbonaceous material as an active negative-electrode material, a positive electrode and a non-aqueous electrolytic solution. The negative electrode is formed of a carbon sintered mass obtained on sintering the carbonaceous material.

Preferably, the negative electrode is prepared by applying a carbonaceous material on a current collector and, thereafter, sintering the assembly to provide the negative electrode.

The present invention is applied to a non-aqueous electrolyte secondary cell having a negative electrode formed of the carbonaceous material as the active negative material, a positive electrode and a non-aqueous electrolytic solution.

According to the present invention, the negative electrode of the non-aqueous electrolyte secondary cell is formed of a carbon sintered mass obtained on sintering the carbonaceous material.

If the carbonaceous material is employed as an active negative electrode material, the conventional practice has been to knead powders of the carbonaceous material with a binder to from a mixture for the negative electrode which is then formed to a desired electrode shape or held by a current collector to constitute the negative electrode. Electrodes of this type have a packing density lowered by an amount corresponding to the amount of the binder employed, such that the energy density of the cell cannot be raised sufficiently.

On the other hand, if the negative electrode includes a carbon sintered mass obtained by directly sintering a binder-free carbonaceous material in accordance with the present invention, the packing density of the active negative electrode material is increased so that a negative electrode having a larger reaction area may be provided. The new and improved negative electrodes of this invention may be used to provide secondary cells having improved energy density and improved charging/discharging efficiency compared to prior art binder-containing active anode material and cells.

The above-mentioned carbon sintered mass can be produced on compression molding of a starting carbonaceous material to the shape of a desired electrode and subsequently sintering the molded mass in an inert gas at a pre-set temperature.

As the starting carbonaceous material, a resinous carbonaceous material, such as petroleum pitch, binder pitch, high molecular resin or green coke, is employed. These resinous carbonaceous material may be used alone or in further combination with graphite; thermally cracked carbons; cokes, such as petroleum coke, pitch coke or coal coke; carbon black, such as acetylene black; vitreous carbon; sintered organic high molecular materials, i.e., organic high molecular materials sintered in an inert gas stream or in vacuum at a suitable temperature such as at 500° C. or higher; carbon fibers; or sintered resins such as furan resin, divinylbenzene or polyvinylidene fluoride to give a starting mixture, which is sintered. The resinous content in the starting materials is carbonized or volatilized off on sintering to give a carbon sintered mass free of the resin content.

The volume density of the sintered mass is preferably 0.8 to 1.95 g/ml. If the volume density is outside the above range, the energy density of the cell cannot be increased sufficiently.

The negative electrode may comprise a carbon sintered mass carried by a current collector. The current collector, if used, leads to improved electrical conductivity of the negative electrode, as a result of which the internal resistance of the cell is lowered to suppress polarization during charging/discharging. The negative electrode carried by the current collector of the negative electrode may be obtained by inserting a current collector in the starting carbonaceous material before compression molding, and by carrying out the compression molding and sintering in this state.

Preferably, the current collector is of a material melting at a temperature higher than 1000° C. and difficult to alloy with lithium so that when the current collector is placed under a sintering atmosphere reaching 1000° C., it is not melted at such high temperature. The current collector may comprise copper, nickel, cobalt, iron, chromium, molybdenum, tantalum, tungsten, stainless steel, titanium and mixtures thereof. The current collector preferably comprises copper, nickel, stainless steel, iron or alloys thereof.

The melting points of these metals are shown in Table 1.

TABLE 1

| Name of Substances | Melting Point (°C.) |
|---|---|
| copper | 1083 |
| nickel | 1455 |
| cobalt | 1492 |
| iron | 1535 |
| chromium | 1905 |
| molybdenum | 2622 |
| tantalum | 2850 |
| tungsten | 3382 |
| stainless steel | 1427–1471 |
| titanium | 1820 |

Since the current collector occupies a small area, it is preferably provided in the form of a foil, mesh, expanded metal or punched metal provided with pores capable of transmitting ions therethrough.

According to the present invention, the carbon sintered mass is employed as the negative electrode. On the other hand, the materials usually employed for this sort of the cell may be employed as the materials for the positive electrode and the electrolytic solution.

As an active positive electrode material, a compound represented by $Li_xMo_2$ where M denotes one or more transition metals, preferably at least one of Co, Ni or Fe, and $0.05 \leq x \leq 1.10$ is employed. The active cathode material may comprise composite oxides such as $LiCoO_2$, $LiNiO_2$ and $LiNi_yCo_{(1-y)}O_2$, where x and y are such that $0.05 \leq x \leq 1.10$ and $0 < y < 1$, and $LiMn_2O_4$.

The composite oxides may be obtained on mixing carbonates of lithium, cobalt or nickel, depending on the composition, and subsequently sintering the mixture in an oxygen atmosphere at a temperature of from 600° to 1000° C. The starting material is not limited to the carbonates and the composite oxides may also be synthesized from hydroxides or oxides.

The electrolyte solution hitherto known may be employed, provided that the solution is an electrolyte dissolved in an organic solvent.

The organic solvents may comprise esters, such as propylene carbonate, ethylene carbonate or γ-butyrolactone, ethers, such as diethylether, tetrahydrofuran, substituted tetrahydrofuran, dioxorane, pyrane, derivatives thereof, dimethoxyethane or diethoxyethane, 3-substituted 2-oxazolidinones, such as 3-methyl-2-oxazolidinone, sulforane, methylsulforane, acetonitrile and propionitrile. These may be used alone or as a mixture.

The electrolytes may comprise lithium perhydrochlorate, lithium boron fluoride, lithium phosphorus fluoride, lithium chloride aluminate, lithium halogenides, trifluoromethane and lithium sulfonate.

The shape of the cell according to the present invention may be a card shape or a square shape employing layered electrodes, such that it is not limited to the so-called coin or button shape.

With the non-aqueous electrolyte secondary cell according to the present invention, the carbon sintered mass, obtained on sintering a carbonaceous material, is employed as a negative electrode material.

As compared to the negative electrode formed of a negative electrode mixture of powders of the carbonaceous materials and the binder, the negative electrode formed of the carbon sintered mass is improved in the packing density of the active material by a value corresponding to the amount of the binder which is not in use, thus giving a larger reaction area. In addition, sintering leads to increased electrically conductivity of the carbonaceous material to decrease the internal resistance of the cell as compared to a non-sintered carbonaceous material, thus improving the energy density and charging/discharging efficiency of the cell.

If the current collector is unified to the carbon sintered mass, the negative electrode is improved in electrical conductivity, thus further improving the charging/discharging efficiency.

With the non-aqueous electrolyte secondary cell of the present invention, since the negative electrode comprises a carbon sintered mass obtained on sintering the carbonaceous material, or a carbon sintered mass-current collector composite material, the secondary cell is improved in the amount of the active material packed in the negative electrode, energy density and in the charging/discharging efficiency. If, above all, the carbon sintered mass-current collector composite material is employed for the negative electrode, further improvement in the electrical conductivity and in the charging/discharging efficiency of the negative electrode may be achieved, thus contributing to the propagation of the portable electronic equipment employing secondary cells.

DESCRIPTION OF THE PREFERRED EMBODIMENTS

Figure 1:
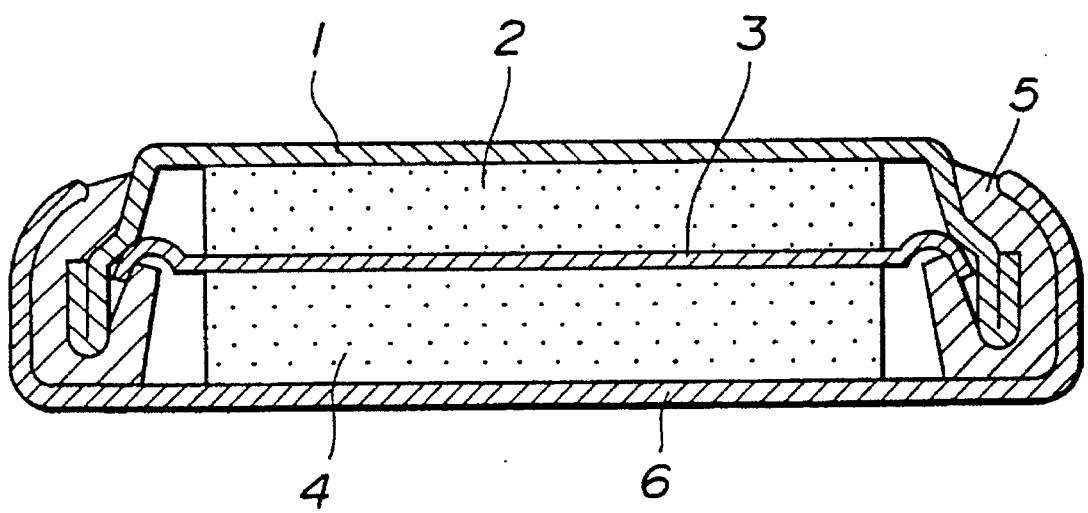
FIG. 1 is a schematic cross-sectional view showing an embodiment of a coin-shaped cell according to the present invention.

The present invention will be explained with reference to illustrative Examples applied to a coin-shaped cell, based upon experimental results.

EXAMPLE 1—1

A coin-shaped cell was produced in the present Example as shown in FIG. 1. In the present Example, such coin-shaped cell was produced in the following manner.

First, for producing a positive-electrode pellet 4, lithium carbonate and cobalt carbonate were mixed together at a molar ratio of 0.5:1 and sintered in air for five hours at a temperature of 900° C. to produce agglomerated $LiCoO_2$ which then was ball-milled and sieved to produce an active positive electrode material having a mean particle size or mean volumetric particle diameter of 10 µm.

91 parts by weight of this active positive electrode material, 6 parts by weight of graphite, as an electrically conductive material, and 3 parts by weight of polyvinylidene fluoride, as a binder, were mixed together. To the resulting mixture was further added N-methyl-pyrrolidone as a dispersant to prepare a positive-electrode paste. This positive-electrode paste was dried and molded to a disc shape 15.5 mm in diameter to prepare a positive-electrode pellet 4.

Then, for preparing a negative-electrode sintered mass 2, a binder pitch manufactured by OSAKA KASEI CO. LTD. under the trade name of TGP 3000 was pelletized to a disc shape 16.5 mm in diameter and compression molded under a pressure of 1 t. The molded product was sintered at a temperature of 1000° C. for three hours to produce a disc-shaped negative-electrode sintered mass 2 which was 16.00 mm in diameter. The volume density d of the sintered mass was 0.8 g/ml.

An electrolytic solution was prepared by dissolving $LjPF_6$ in a mixed liquid of ethylene carbonate and diethyl carbonate at a concentration of 1 mol/liter.

The positive-electrode pellet 4 and the negative-electrode sintered mass 2 were then housed in a positive-electrode can 6 and a negative-electrode cup 1, respectively, and were layered via a thin-film separator 3 of polypropylene in-between. The electrolytic solution was charged into the can which was caulked in the following manner.

That is, the binder pitch TGP 3000 was pelletized to a disc shape 16.5 mm in diameter and compression molded at a pressure of 4 t. The molded product was sintered in an inert gas for three hours at a temperature of 1000° C. to produce a negative-electrode sintered disc-shaped molded product 16.0 mm in diameter. The volume density of the sintered mass was 1.4 g/ml.

EXAMPLE 1-5

A coin-shaped cell was prepared in the same way as in Example 1—1 except preparing a negative-electrode sintered mass in the following manner.

That is, the binder pitch TGP 3000 was pelletized to a disc shape 16.5 mm in diameter and compression molded at a pressure of 5 t. The molded product was sintered in an inert gas for three hours at a temperature of 1000° C. to produce a negative electrode sintered disc-shaped molded product 16.0 mm in diameter. The volume density of the sintered mass was 1.8 g/ml.

EXAMPLE 1-6

A coin-shaped cell was prepared in the same way as in Example 1—1 except preparing a negative-electrode sintered mass in the following manner.

That is, the binder pitch TGP 3000 was pelletized to a disc shape 16.5 mm in diameter and compression molded at a pressure of 10 t. The molded product was sintered in an inert gas for three hours at a temperature of 1000° C. to produce a negative-electrode sintered disc-shaped molded product 16.0 mm in diameter. The volume density of the sintered mass was 1.95 g/ml.

EXAMPLE 1-7

A coin-shaped cell was prepared in the same way as in Example 1—1 except preparing a negative-electrode sintered mass in the following manner.

First, pitch coke was pulverized for 15 minutes to a powder in a vibration mill containing stainless steel balls 12.7 mm in diameter. The true density of the pitch coke was 2.03 $g/cm^3$, while the spacing of the (002) plane as found by X-ray diffraction pursuant to the Law for the Japan Society for the Promotion of Science was 3.46° and the crystal thickness along the C-axis Lc was 40°. The mean particle size was 33 µm.

50 wt % of the pitch coke powder and 50 wt % of the binder pitch TGP 3000 were weighed out and mixed together in a mortar. The mixture was pelletized to a disc-shaped pellet 16 mm in diameter and compression molded at a pressure of 3 t. The molded product was sintered in an inert gas at 1000° C. for three hours to give a disc-shaped negative-electrode sintered mass 16 mm in diameter. The volume density d of the sintered mass was 1.2 g/ml.

EXAMPLE 1-8

A coin-shaped cell was prepared in the same way as in Example 1—1 except preparing a negative-electrode sintered mass in the following manner.

50 wt % of graphite, manufactured by LONZA INC. under the trade name of KS-15 and 50 wt % of the binder pitch TGP 3000 were weighed out and mixed together in a mortar. The resulting mixture was pelletized to a disc-shaped pellet 16.5 mm in diameter and compression molded at a pressure of 3 t. The molded product was sintered in an inert gas at 1000° C. for three hours to give a disc-shaped negative-electrode sintered molded product 16 mm in diameter. The volume density d of the sintered molded product was 1.5 g/ml.

Comparative Example 1—1

A coin-shaped cell was prepared in the same way as in Example 1—1 except preparing a negative electrode in the following manner.

90 parts by weight of powders of the pitch coke, which were the same as those employed in Example 1-7, and 10 parts by weight of polyvinylidene chloride as a binder, were mixed together. To the resulting mixture was added N-methyl-pyrrolidone as a dispersant to prepare a paste, which was then dried and compression molded to a disc 16 mm in diameter to prepare a negative-electrode pellet 2.

The internal resistance, charging capacity and the discharging capacity were measured of the cells of the Examples 1—1 to 1-8 and the Comparative Example 1—1 prepared as described above.

The charging and discharging were carried out under a condition that constant-current charging was carried out under the conditions of a charging current of 1 mA and a terminal voltage of 4.2 V after which constant current discharging was carried out under the conditions of a discharging current of 1 mA and a terminal voltage of 3.0 V. The results are shown in Table 2.

TABLE 2

|  | Binder Quantity % | Negative Electrode Density g/ml | Cell Internal Resistance Ω | Charging Capacity mAh | Discharging Capacity mAh | Charging/ Discharging Efficiency % |
| --- | --- | --- | --- | --- | --- | --- |
| Comp. Ex. 1-1 | 10 | 1.0 | 15 | 57 | 43 | 75 |
| Ex. 1-1 | 0 | 0.8 | 6 | 58 | 53 | 92 |
| Ex. 1-2 | 0 | 1.0 | 8 | 66 | 60 | 90 |
| Ex. 1-3 | 0 | 1.2 | 9 | 79 | 71 | 90 |
| Ex. 1-4 | 0 | 1.4 | 10 | 92 | 79 | 85 |
| Ex. 1-5 | 0 | 1.8 | 10 | 119 | 98 | 82 |
| Ex. 1-6 | 0 | 1.95 | 10 | 129 | 103 | 80 |
| Ex. 1-7 | 0 | 1.2 | 8 | 72 | 67 | 92 |
| Ex. 1-8 | 0 | 1.5 | 5 | 99 | 94 | 95 |

It is seen from Table 2 that, as compared to the cell of the Comparative Example 1—1 containing the binder in its negative electrode, the cells of Examples 1—1 to 1-8 employing the carbon sintered mass for negative electrodes thereof are higher in their negative electrode density and superior in the charging/discharging efficiency. The internal resistance of the cells of the Examples 1—1 to 1-8 are also lower. Above all, with the cells of the Examples 1-7 and 1-8, in which the carbon sintered mass is produced from the mixture of the binder pitch with the pitch coke and the mixture of the binder pitch and graphite, respectively, the charging/discharging efficiency shows extremely high values of 92% and 95%, respectively.

For checking an upper limit of the volume density of the negative-electrode sintered mass, sintering was carried out under the same conditions as those of Example I except setting the molding pressure of the binder pitch to 20 t to produce a negative-electrode sintered mass having a volume density of 2.0 g/ml. The sintered mass, thus produced, was built into a coin-shaped cell. The internal resistance, charging capacity, discharging capacity and the charging/discharging capacity of the cell were found to be 20 ohm, 132 mAh, 40 mAh and 30%, respectively. These characteristics are inferior as compared to those of the cell of the Comparative Example 1—1. It is seen from this that the volume density of the negative-electrode sintered mass which is simply higher is not satisfactory and that it is necessary to prescribe the range of the volume density to e.g., 0.8 to 1.95 g/ml.

EXAMPLE 2-1

A coin-shaped cell was prepared in the same way as in Example 1—1 except that a composite sintered mass of a carbon sintered mass and a carbon collector produced in a manner now to be described was employed for a negative electrode.

A special binder pitch manufactured by OSAKA KASEI CO. LTD. under the trade name of LEC-1 was temporarily sintered in an inert gas at 900° C. for one hour to provide a temporarily sintered mass (pitch coke) which was then pulverized to a particle size not more than 25 mesh size. This temporarily sintered mass (pitch coke) and an unsintered special binder LEC-1 were mixed at a ratio of 1:1 to give a powder mixture which was then temporarily molded to a pellet shape. Into a mid part of the powder mixture was inserted copper expanded metal and the resulting mass was compression molded under a pressure of 3 t to a pellet 16.5 mm in diameter. The copper expanded metal was 0.1 mm in thickness with pores of 1×2 mm in shape and with the pore ratio being 50%.

The molded-product was sintered in an inert gas at 1000° C. for three hours to produce a sintered composite product of the carbon sintered body and the current collector. The composite product was 16.0 mm in diameter. The volume density d of the carbonaceous portion of the sintered composite product, excluding the current collector portion, was 1.2 g/ml.

EXAMPLE 2—2

A coin-shaped cell was prepared in the same way as in Example 2-1, except that, for producing a carbon sintered body current collector composite disc-shaped product, a copper foil 0.1 mm thick was used as a current collector and applied to a lateral surface of the carbon sintered mass for compositization. The volume density d of the carbonaceous portion of the sintered composite product, excluding the current collector portion, was 1.2 g/ml.

EXAMPLE 2-3

A coin-shaped cell was prepared in the same way as in Example 2-1, except that, for producing a carbon sintered body current collector composite disc-shaped product, punching metal with a pore ratio of 50%, a thickness of 0.1 mm and a pore diameter of 1 mm was used as a current collector. The volume density d of the carbonaceous portion of the sintered composite product, excluding the current collector portion, was 1.2 g/ml.

EXAMPLE 2-4

A coin-shaped cell was prepared in the same way as in Example 2-1, except that, for producing a carbon sintered body current collector composite disc-shaped product, nickel expanded metal with a pore ratio of 50% was used as a current collector. The volume density d of the carbonaceous portion of the sintered composite product, excluding the current collector portion, was 1.2 g/ml.

EXAMPLE 2-5

A coin-shaped cell was prepared in the same way as in Example 2-1, except that, for producing a carbon sintered body current collector composite disc-shaped product, stainless steel 304 expanded metal with a pore ratio of 50% was used as a current collector. The volume density d of the carbonaceous portion of the sintered composite product, excluding the current collector portion, was 1.2 g/ml.

Comparative Example 2-1

A coin-shaped cell was prepared in the same way as in Example 1—1, except that a pellet of a negative electrode mixture and a current collector bonded to each other under pressure were employed for a negative electrode. The pellet of the negative electrode mixture and the current collector bonded to each other under pressure were prepared by attaching the current collector to a pellet formed of the negative electrode mixture in the following manner.

That is, 90 parts by weight of pitch coke powders, which were the same as those employed in Example 1-7, and 10 parts by weight of polyvinylidene fluoride, as a binder, were mixed together to prepare a negative electrode mixture to which N-methylpyrrolidone was added as a dispersant to give a paste of the negative electrode mixture. This paste was dried to a pellet 16.0 mm in diameter and pressed against and bonded to a copper expanded metal as a current collector to produce a negative electrode.

The internal resistance, charging capacity, discharging capacity and the charging/discharging efficiency of the coin-shaped cells of the Examples 2-1 to 2-5 and the Comparative Example 2-1, thus produced, were measured. The charging and discharging were carried out under a condition that constant current charging was carried out at a charging current of 1 mA and a terminal voltage of 4.2 V, after which constant current discharging was carried out at a discharging current of 5 mA and at up to a terminal voltage of 3.0 V. The results are shown in Table 3. For comparison, similar measurements were made of the cells of Comparative Example 2—2 in which only the carbon sintered mass with a volume density of 1.2 g/ml was used for the negative electrode without employing a current collector. The results are also shown in Table 3.

material and the binder on one hand and the current collector on the other hand are bonded under pressure to each other so as to be used for its negative electrode, or a cell of Examples 1 to 3 in which only the carbon sintered mass is used for its negative electrode, the cells of Examples 2-1 to 2-5, in which a sintered composite product of the carbon sintered mass and the current collector is employed for a negative electrode, is high in charging capacity and discharging capacity and superior in charging/discharging efficiency, as shown in Table 3. This is possibly due to the fact that the reaction area is increased by not employing the binder as the negative electrode, and that the negative electrode is improved in electrical conductivity by unifying the metal current conductor to the carbonaceous material by sintering, as a result of which the internal resistance of the cell is decreased and the polarization during charging/discharging is diminished.

It is seen from this that the carbon sintered mass combined with the current collector leads to further improvement of the performance of the cell.

Although the foregoing description has been made of a coin-shaped cell, the present invention may also be applied to a system employing a layered electrode with similar favorable effects. Thus the technique disclosed herein is highly effective when applied to a square-shaped cell or a card type cell. In addition, similar effects to those produced with the use of the special binder pitch LEC-1 may naturally be produced with the use of carbonaceous materials other than the special binder pitch LEC-1.

What is claimed is:

1. A non-aqueous secondary cell comprising:

an active cathode material comprising a lithium composite oxide;

an electrolyte comprising a lithium salt dissolved in a non-aqueous organic solvent; and a sintered composite anode comprising a metal support with a thermoplastic binder free electrically conductive sintered carbonaceous material having a volume density of from about 0.8 to about 1.95 g/ml disposed thereon, said sintered composite anode being obtained from compression molding a carbonaceous starting material comprising a thermoplastic binder free binder pitch to said metal support to form a composite product and thereafter sintering the composite product by heating in an inert gas at an elevated temperature of from about 500° C. to about 1000° C. until sintering is substantially complete.

2. The non-aqueous electrolyte secondary cell as defined in claim 1, wherein said metal support comprises a metal or an alloy melting at 1000° C. or higher.

TABLE 3

|  | Binder Quantity % | Metal Current Collector | Negative Electrode Density g/ml | Cell Internal Resistance Ω | Charging Capacity mAh | Discharging Capacity mAh | Charging/ Discharging Efficiency % |
| --- | --- | --- | --- | --- | --- | --- | --- |
| Comp. Ex. 2-1 | 10 | Yes | 1.0 | 15 | 57 | 43 | 75 |
| Comp. Ex. 2-2 | 0 | No | 1.2 | 12 | 66 | 53 | 80 |
| Ex. 2-1 | 0 | Yes | 1.2 | 6 | 66 | 61 | 92 |
| Ex. 2-2 | 0 | Yes | 1.2 | 8 | 66 | 60 | 91 |
| Ex. 2-3 | 0 | Yes | 1.2 | 7 | 66 | 60 | 91 |
| Ex. 2-4 | 0 | Yes | 1.2 | 8 | 66 | 60 | 91 |
| Ex. 2-5 | 0 | Yes | 1.2 | 9 | 66 | 60 | 91 |

As compared to a cell of Comparative Example 2-1 in which a pellet of a negative electrode mixture of the carbonaceous 3. The non-aqueous electrolyte secondary cell as defined in claim 1, wherein said metal support comprises a copper, nickel, stainless steel, iron or mixtures thereof.

4. The non-aqueous electrolyte secondary cell as defined in claim 1, wherein said metal support comprises a metal sheet having numerous pores.

5. The non-aqueous electrolyte secondary cell as defined in claim 1, wherein said metal support comprises a metal mesh, an expanded metal sheet or a punched metal sheet.

6. A non-aqueous secondary cell comprising:

an active cathode material comprising a lithium composite oxide;

an electrolyte comprising a lithium salt dissolved in a non-aqueous organic solvent; and an active anode material comprising a thermoplastic binder free electrically conductive sintered carbonaceous material having a volume density of from about 0.8 to about 1.95 g/ml, said sintered carbonaceous material being obtained by compression molding a carbonaceous starting material comprising a thermoplastic binder free binder pitch at elevated pressures of from about 1 to about 10 torr to form a shaped mass and thereafter, sintering the shaped mass by heating in an inert gas at an elevated temperature of from about 500° C. to about 1000° C. until sintering is substantially complete.

7. A non-aqueous secondary cell as defined in claim 6, wherein said carbonaceous starting material comprises a mixture of pitch coke and binder pitch.

8. A non-aqueous secondary cell as defined in claim 6, wherein said carbonaceous starting material comprises a mixture of binder pitch and graphite.

* * * * *